Dec. 22, 1931.  S. E. TRAVIS, JR  1,837,927
UNDERFRAME FOR THE BOTTOM OF TRUCK BODIES
Filed March 12, 1929   2 Sheets-Sheet 1
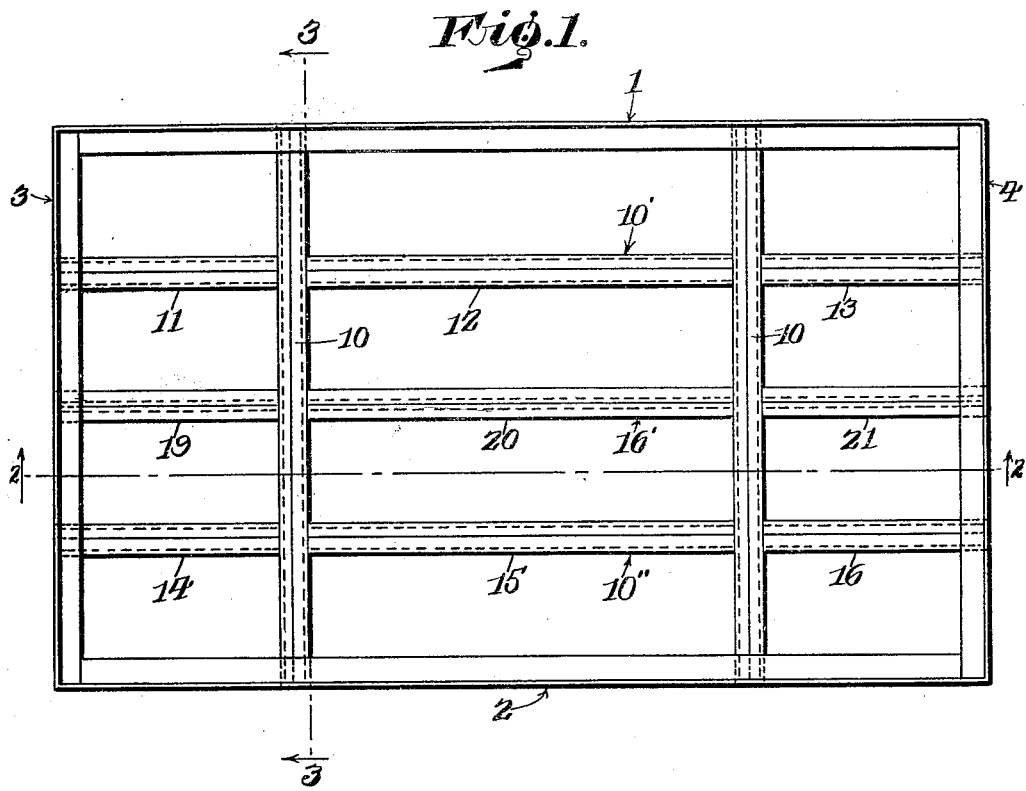
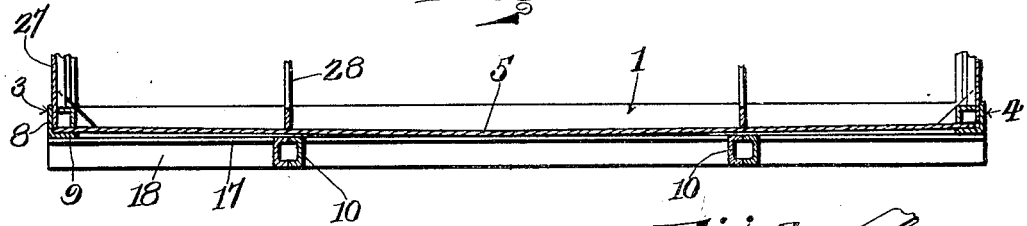
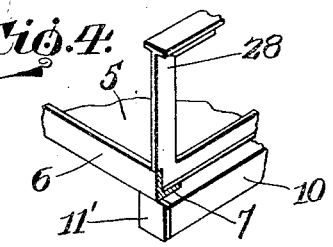
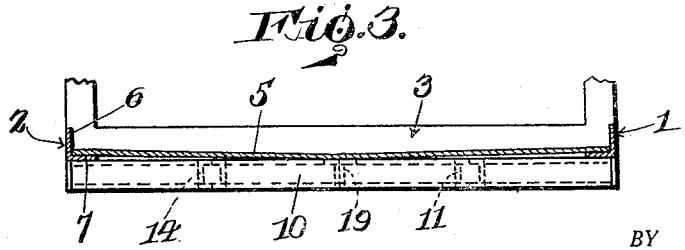
INVENTOR.
Simeon E. Travis, Jr.
BY
Geo. P. Kimmel
ATTORNEY.

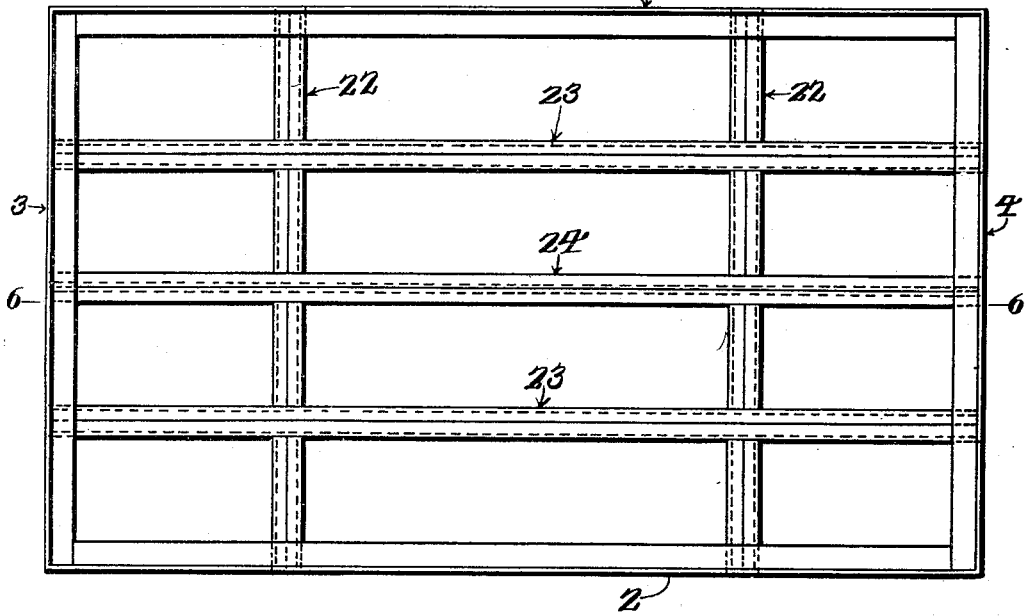
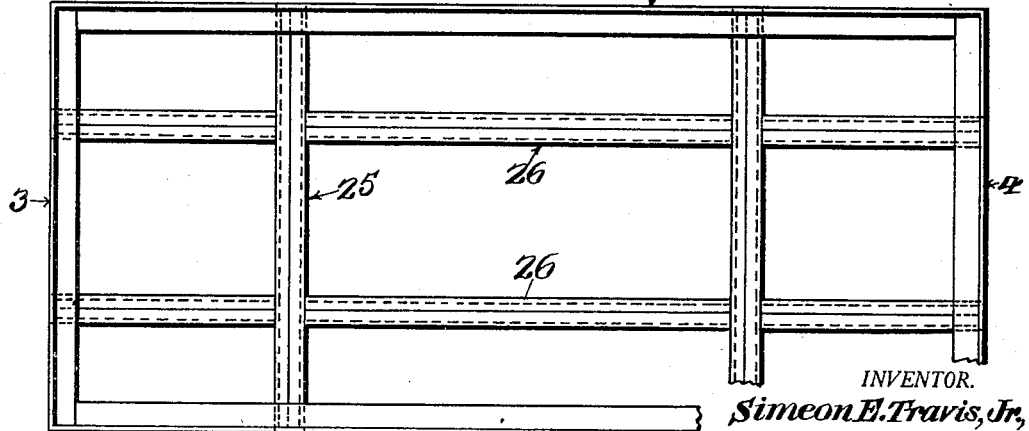

Patented Dec. 22, 1931

1,837,927

UNITED STATES PATENT OFFICE

SIMEON E. TRAVIS, JR., OF HATTIESBURG, MISSISSIPPI, ASSIGNOR TO THE WELDMECH STEEL PRODUCTS CO., A CORPORATION OF MISSISSIPPI

UNDERFRAME FOR THE BOTTOM OF TRUCK BODIES

Application filed March 12, 1929. Serial No. 346,344.

This invention relates to truck bodies, more particularly to an underframe for the bottom thereof and is designed primarily for use in connection with a truck body having one or more decks and of that type designed primarily for the handling of crated, or boxed bottled goods, and the invention has for its object to provide, in a manner as hereinafter set forth, a new and novel form of underframe for reinforcing the bottom of the truck body and with the underframe so constructed and arranged to permit of the truck body being attached to any form of chassis, and further with the underframe acting to prevent sagging of the bottom of the truck body, or when the truck body is formed with plural decks to prevent sagging of the floor of the lowermost deck.

Further objects of the invention are to provide, in a manner as hereinafter set forth, an underframe for a truck body which is simple in its construction and arrangement, strong, durable, compact, readily installed with respect to the bottom of the truck body, of minimum weight and inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a top plan view of the bottom of a truck body, with the flooring removed and showing the adaptation therewith of an underframe in accordance with this invention.

Figure 2 is a section on line 2—2 Figure 1 with the flooring in position.

Figure 3 is a section on line 3—3 Figure 1 with the flooring in position.

Figure 4 is a fragmentary view illustrating an arrangement of supporting an upper deck on the lower deck and with the means providing a partition for the lower deck.

Figure 5 is a top plan view of the lower deck and bottom of a truck body and with the flooring removed and showing the adaptation therewith of a modified form of underframe in accordance with this invention.

Figure 6 is a section on line 6—6 Figure 5.

Figure 7 is a view similar to Figure 5, partly broken away and illustrating another modified form of underframe.

As shown, with reference to Figures 1, 2, 3 and 4, the lowermost deck or bottom of the truck body includes a pair of side rails 1, 2, a pair of end rails 3, 4 and a flooring 5. Each of the rails is of angle-shaped cross section to provide a vertical and a horizontal portion. The horizontal portion extends inwardly from the bottom of the vertical portion. The vertical portions of the side rails are indicated at 6 and the horizontal portions at 7. The vertical portions of the end rails are indicated at 8 and the horizontal portions at 9. The side and end rails are welded together, or connected together in any suitable manner. The flooring 5 is secured upon the horizontal portions 7 and 9.

An underframe, in accordance with this invention, and as illustrated in Figures 1, 2 and 3, includes opposed, spaced, transversely extending cross sills, opposed, spaced, longitudinally extending sub-sills and longitudinally extending bracing means interposed between the cross sills and sub-sills.

The sills are arranged in sets and the sills of one set are disposed at right angles to the sills of the other set. Each of the sills is tubular and of polygonal cross section. Each of the sills of one set is formed of a pair of oppositely disposed channel bars. Each of the sills of the other set is formed of a plurality of spaced, endwise opposed, aligning sections and with each section formed of a pair of oppositely disposed channel bars. Certain of the sections of the sills of one set abut and are secured to the sills of the other set. Each of the sills formed of a single pair of bars have the bars of the pair arranged relative to each other whereby the sill will stand on a flange of each of the bars and with the bars opening sidewise toward each other and by this arrangement each bar will be disposed to have an upper and a lower flange. The oppositely disposed pair of channel bars which provides a sill have the lengthwise extending edges of the flanges thereof secured together in abutting relation providing thereby a tubular structure. Each section of the sectional sill has the bars thereof arranged relatively to each other whereby the section will stand on a flange of each of the bars and with the bars opening sidewise toward each other and by this arrangement each bar is so disposed to have an upper and a lower flange. The flanges of the pair of channel bars which provide a sill section have their lengthwise edges thereof secured in abutting relation thereby forming the section tubular.

The cross sills are indicated at 10 and have the upper faces thereof at the ends secured against the lower faces of the horizontal portions 7 of the side rails 1, 2. The cross sills are of a length slightly less than the distance between the outer side faces of the vertical portions of the side rails 1, 2. The ends of the cross sills are closed by cap plates 11' which are flush with the outer side faces of the vertical portions of the side rails 1, 2. Each cross sill, as shown, is disposed between the transverse median and one end of the truck bottom. It is to be understood however that the number of cross sills 10 employed can be increased if desired, but such sills are to be arranged in spaced relation.

The sub-sills are indicated generally at 10″, 11″ and each is illustrated as formed of a plurality of sections. The number of the sections of each sub-sill is one more than the number of cross sills employed. If two cross sills are employed, then the number of sections of each sub-sill will be three. As two cross sills are illustrated, each sub-sill is formed of three sections. The sections of sub-sill 10' are indicated at 11, 12 and 13 and those of the other sub-sill at 14, 15 and 16. The sections 11 and 14 are secured to the lower faces of the horizontal portions of the end rail 3 and said sections 11, 14 further abut and are welded to the outer side of that cross sill which is arranged adjacent end rail 3.

The sections 13, 16 are secured against the lower face of the horizontal portion 9 of the end rail 4 and also abut and are secured to the other side of that cross sill 10 which is arranged adjacent to end rail 4. The sections 12, 15 are arranged between the cross sills, abut thereagainst and are secured therewith by welding. The sections 11, 12 and 13 are arranged in endwise opposed alignment and the sections 14, 15 and 16 are arranged in the same manner. The upper faces of the cross sills are flush with the upper faces of the sub-sills. The lower faces of the cross sills are flush with the lower faces of the sub-sills. The sections 12 and 15 are of greater length than the sections 11, 13, 14 and 16. The outer ends of sections 11, 14, 13 and 16 are closed by a cap plate, similar to cap plate 11' and with the cap plates closing the outer ends of the sections referred to being flush with the outer sides of the vertical portions 8 of the end rails 3, 4.

Positioned between the sub-sills is a combined T-shaped brace and reinforcement 16' formed of a set of endwise opposed, T-shaped sections. The brace 16' can be formed of a single T or of two angle irons arranged in abutting relation. As illustrated the brace 16' is set up of two oppositely disposed angle irons arranged in abutting relation to provide a head 17 and a stem 18. The irons are secured together, preferably by welding. Preferably each brace member is of the same height as the height of a cross or sub-sill. The sections of the brace 16' are indicated at 19, 20 and 21. The section 20 is arranged between, abuts against and is welded to the cross sills. The section 19 is secured to the lower face of the horizontal portion of the end rail 3 and abuts against and is welded to that cross sill arranged in proximity to end rail 3. The section 21 is secured to the lower face of the horizontal portion 9 of the end rail 4 and abuts against and is welded to that cross sill 10 arranged adjacent to end rail 4. The heads 17 of the sections are flush with the upper faces of the cross sills 10. The bottom edges of the stems or shanks 18 of the sections are flush with the lower faces of the cross sills 10.

In the forms shown in Figures 5 and 6 the difference resides in forming each cross sill 22 of a plurality of spaced, endwise opposed sections, the setting up of each sub-sill 23 of a single unit and the setting up of the T-shaped brace 24 of a single unit. In Figure 5 the sections of each cross sill abut against and are secured to the sub-sills and T-shaped brace. The cross sills, sub-sills and T-shaped brace shown in Figure 5 are secured to the side and end rails 1, 2, 3 and 4 of the bottom of the truck body in the same manner as that shown in Figure 1. Otherwise than as stated the form shown in Figures 5 and 6 is the same as that shown in Figure 1.

The form shown in Figure 7 is the same as that shown in Figure 1, with this exception, that the T-shaped brace is not employed. In Figure 7 the cross sills are indicated 25 and the sub-sills at 26.

In Figure 2, corner rails 27 are shown, but form no part of this invention. In Figures 2, 3 and 4 a combined supporting and partition means 28 is shown but forms no part of this invention. The means 28 is interposed between the lower and upper decks of the truck body.

It is thought that the many advantages of an underframe in accordance with this invention can be readily understood, and although the preferred embodiment of the invention is as illustrated and described, yet it is to be understood that changes in the details of construction can be had which will fall within the scope of the invention as claimed.

What I claim is:

1. In a truck body, a pair of opposed, spaced, parallel side rails, a pair of opposed, spaced, parallel end rails having the ends thereof secured to the ends of the side rails, each of said rails including a vertical and a horizontal leg and with the latter extending inwardly from the bottom of the former, a set of tubular cross sills, a set of tubular sub sills, the sills of one set disposed at right angles to the sills of the other set, each of the sills of one set consisting of a pair of oppositely disposed channel bars standing on one flange thereof, of a length to extend from one horizontal leg of one pair of opposed horizontal legs to the other leg of such pair, having the lengthwise edges of the flanges thereof secured together in abutting relation and the other flange of each bar of the pair having its upper face secured to the lower face of such pair of opposed legs, and each of the sills of the other of said sets consisting of endwise opposed, aligning, spaced sections each consisting of a pair of oppositely disposed channel bars standing on one flange thereof and having the lengthwise edges of the flanges thereof secured together in abutting relation, certain of said sections being secured to the sides of the sills of the other of said sets, and the outer sections of each sectional sill having the outer ends of upper faces thereof secured to the lower faces of the other pair of opposed horizontal legs.

2. In a truck body, a pair of opposed, spaced, parallel side rails, a pair of opposed, spaced, parallel end rails having the ends thereof secured to the ends of the side rails, each of said rails including a vertical and a horizontal leg and with the latter extending inwardly from the bottom of the former, a set of tubular cross sills, a set of tubular sub sills, the sills of one set disposed at right angles to the sills of the other set, each of the sills of one set consisting of a pair of oppositely disposed channel bars extending on one flange thereof, of a length to extend from one horizontal leg of one pair of opposed horizontal legs to the other leg of such pair, having the lengthwise edges of the flanges thereof secured together in abutting relation and the other flange of each bar of the pair having its upper face secured to the lower face of such pair of opposed legs, and each of the sills of the other of said sets consisting of endwise opposed, aligning, spaced sections each consisting of a pair of oppositely disposed channel bars standing on one flange thereof and having the lengthwise edges of the flanges thereof secured together in abutting relation, certain of said sections being secured to the sides of the sills of the other of said sets, the outer sections of each sectional sill having the outer ends of upper faces thereof secured to the lower faces of the other pair of opposed horizontal legs, and a brace having its upper face secured to the lower faces of a pair of opposed horizontal legs, its sides secured to opposed sections of the sectional sills of one set and positioned between and spaced from the sills of the other set.

3. In a truck body, a rectangular frame including side and end rails of angle shape cross section to provide a pair of opposed horizontal end legs and a pair of opposed horizontal side rails, two sets of tubular sills of polygonal cross section, said sets disposed at right angles to each other, each of the sills of one set being uninterrupted and extending from one horizontal leg to the other horizontal leg of a pair and having the ends of the upper face thereof secured to the lower faces of said legs of such pair, each of the sills of the other set formed of a series of endwise opposed aligning sections and with the outer sections of the series having the outer ends of the upper faces thereof secured to the lower faces of the other pair of opposed horizontal legs, the sections of the sills of one set being secured to the sides of the sills of the other set.

4. In a truck body, a rectangular frame including side and end rails of angle shape cross section to provide a pair of opposed horizontal end legs and a pair of opposed horizontal side rails, two sets of tubular sills of polygonal cross section, said sets disposed at right angles to each other, each of the sills of one set being uninterrupted and extending from one horizontal leg to the other horizontal leg of a pair and having the ends of the upper face thereof secured to the lower faces of said legs of such pair, each of the sills of the other set formed of a series of endwise opposed aligning sections and with the outer sections of the series having the outer ends of the upper faces thereof secured to the lower faces of the other pair of opposed horizontal legs, the sections of the sills of one set being secured to the sides of the sills of the other set, and a brace having its upper face secured to the lower faces of a pair of opposed horizontal legs, its sides secured to opposed sections of the sectional sills of one set and positioned between and spaced from the sills of the other set.

In testimony whereof, I affix my signature hereto.

SIMEON E. TRAVIS, Jr.